United States Patent Office 3,515,045
Patented June 2, 1970

3,515,045
CAMERA COUPLED LIGHT MEASURING SYSTEM
Naoyuki Uno, Urawa-shi, Japan, assignor to Asahi Kogaku Kogyo Kabushiki Kaisha, Tokyo-to, Japan, a corporation of Japan
Filed Mar. 15, 1967, Ser. No. 623,380
Claims priority, application Japan, Mar. 24, 1966, 41/17,683; Apr. 2, 1966, 41/29,971
Int. Cl. G01j 1/16
U.S. Cl. 95—10
2 Claims

ABSTRACT OF THE DISCLOSURE

A camera coupled light measuring system includes a differential current meter having bucking windings, one winding being connected through a light sensing network to a battery and the other winding being connected through a plurality of parallel connected variable resistors to said battery. The variable resistors, in one form of the system, are connected to an objective diaphragm ring, a film sensitivity ring and a member varying with the degree of coupling of an associated screw mounted objective. In another form of the system, one variable resistor is adjusted in accordance with the film sensitivity or shutter speed or a function of both and a switch controlled by an automatic-manual diaphragm selector alternatively inserts one of the other two variable resistors in parallel with the first, one of which is adjusted in accordance with the set diaphragm value. The light sensing network includes a series connected photoconductor and resistor, the photoconductor being shunted by a second series connected photoconductor and resistor.

BACKGROUND OF THE INVENTION

The present invention relates generally to improvements in light measuring systems and it relates particularly to an improved camera coupled light measuring system.

In camera coupled exposure meter systems adjustments corresponding to various photographing conditions such as shutter speed and diaphragm aperture are applied to the meter system in response to the angular displacement of the shutter speed ring or the diaphragm ring respectively.

When an objective interchangeable camera such as a single lens reflex camera is provided with a coupled exposure meter arrangement, the coupling arrangement between the diaphragm ring of the interchangeable objective and the meter arrangement must be releasable and it is necessary to avoid any coupling error. With a screw-mount type objective-camera system, the final screwed-in position of the objective relative to the camera body is rarely free of error. This is due to personal difference in the screwing-in force and also to limitations in precise machining of the objective mount portion. Owing to such error the diaphragm value index upon the objective barrel is not always brought to a constant position relative to the camera body. The angular displacement of the diaphragm ring under such condition would give an erroneous photographing indication to the meter system, resulting in an erroneous exposure value. Accordingly, an arrangement is necessary for correcting such error.

Moreover, in a single lens reflex camera provided with an internal light receiving type (TTL type) exposure meter arrangement, in the automatic diaphragm system exposure setting operation with fully open diaphragm aperture, an indication of the predetermined diaphragm value must be provided by some means. On the other hand, in an exposure setting operation with stopped-down diaphragm, the light amount falling upon the light sensitive element of the exposure meter is already under the diaphragm control so that the aforementioned operation is not necessary. Thus, in some cases an indication of the diaphragm condition must be applied to the exposure meter arrangement while in other cases such indication must be avoided.

It is conventional that for performing such operation the meter and the diaphragm setting ring are mechanically coupled together and the meter itself is caused to rotate so that the reference point of the pointer (the point where the pointer starts to deflect) is displaced in accordance with the set diaphragm value. The arrangement would become extremely complicated if such coupling arrangement should be further provided with a decoupling arrangement and a meter fixing arrangement.

SUMMARY OF THE INVENTION

A principal object of the present invention is to provide an improved camera coupled light measuring system.

Another object of the present invention is to provide an improved coupled light measuring system in a camera provided with a screw coupled interchangeable objective wherein said light measuring system is compensated in accordance with the degree of screw coupling of the objective.

Still another object of the present invention is to provide an improved camera coupled light measuring system which is switched to corresponding operational modes with the alternative use of an automatic diaphragm or a manually stopped down diaphragm procedure.

A further object of the present invention is to provide a light measuring system of the above nature characterized by its reliability, simplicity and accuracy.

The above and other objects of the present invention will become apparent from a reading of the following description taken in conjunction with the accompanying drawings which illustrate preferred embodiments thereof.

In a sense the present invention contemplates the provision of a photographic camera light measuring system comprising a current meter including a pair of opposing first and second coils, a voltage source, a photoconductor, means connecting said photoconductor and said first coil in series across said voltage source, and means for applying an adjustable current through said second coil. According to one form of the present system the current applying means includes three parallel connected variable resistors connecting the second coil to a voltage source, one of the variable resistors being adjusted with the diaphragm set ring, another variable resistor being adjusted with the film sensitivity ring and the third variable resistor being adjusted by a member carried by a screw mounted camera interchangeable objective in accordance with the degree of coupling thereof. In accordance with another form of the present system the current applying means includes a pair of variable resistors and a switch actuated with a diaphragm automatic-manual selector member for connecting the second coil alternatively through said variable resistors to the voltage source.

The present system is reliable, simple and accurate and provides compensation for any improper coupling of a screw mounted interchangeable objective and assures a proper correlation between the light measuring system and the diagram adjustment mode, whether automatic or manual.

DESCRIPTION OF THE PREFERRED EMBODIMENTS

Figure 1:
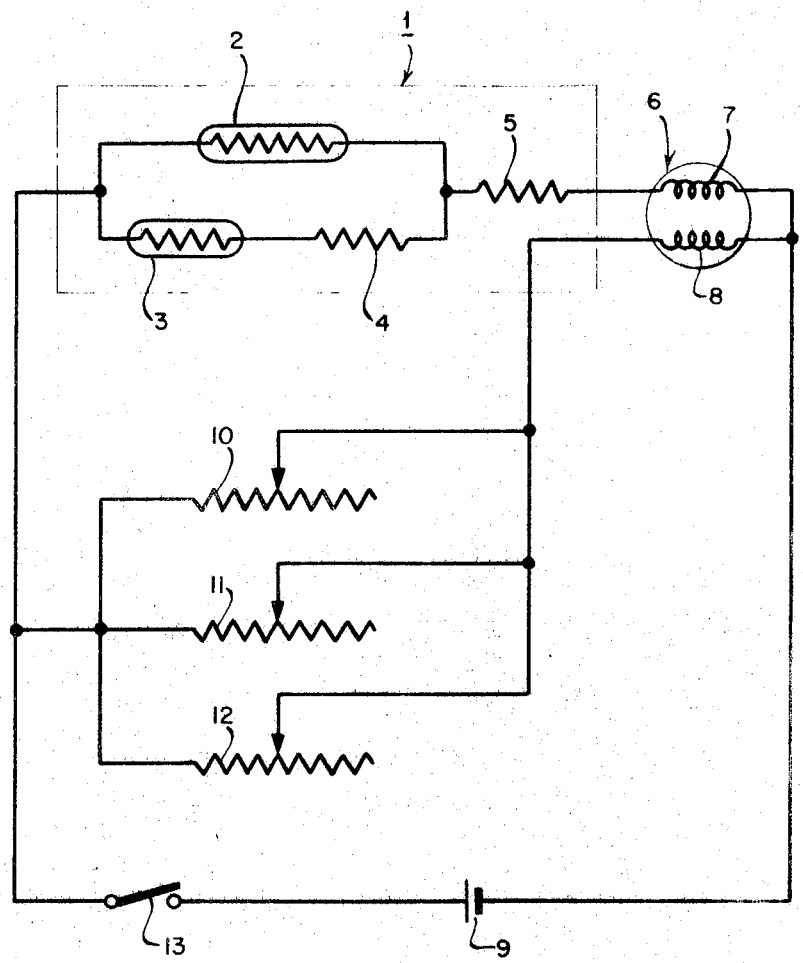
FIG. 1 is a circuit diagram of a network embodying the present invention.

Referring now to the drawings and more particularly FIG. 1 thereof which illustrates a preferred embodiment of the present invention, the reference numeral 1 generally designates a light responsive network which is associated with a camera having an interchangeable objective wherein the objective is separably attached to the camera body by a screw coupling arrangement such screw couplings being characterized by angular variations of the coupled position of the objective to the objective mount carried by the camera body, depending upon the torque applied thereto and other conditions. The network 1 includes a first photoconductor 2 connected in series with a first resistor 5, and a second photoconductor 3 connected in series with a second resistor 4 across the first photoconductor 2, the terminals of the network 1 being the junction of the photoconductors 2 and 3 and the outer end of the resistor 5. The photoconductors 2 and 3 are normally exposed to the camera incident light, advantageously that light which passes through the objective and camera diaphragm, as characterizes through the lens or internal light measuring systems. The resistances and response characteristics of the resistors 4 and 5 and the photoconductors 2 and 3 are such, that the current flowing through the network 1 in response to light incident on the photoconductors 2 and 3 and with a substantially fixed voltage applied to the terminals thereof varies in an arithmetic progression with the photoconductor incident light intensity varying in a geometric progression with a common ratio of 2.

A current meter 6 of the differential type includes a pair of opposing exitation or motivating coils 7 and 8 respectively, the meter 6 responding to the difference in the currents traversing the coils 7 and 8. The meter 6 may provide a visual indication of the current therethrough or may be coupled to or control a camera adjustable parameter or both. The light sensing network 1, the meter coil 7 and a switch 13 are connected in series between the terminals of a voltage source battery 9.

Three variable resistors 10, 11 and 12 respectively are connected in parallel with each other and the parallel connected variable resistors are connected in series with the meter coil 8 and the switch 13 between the terminals of the battery 9. Suitable means are provided for connecting the variable resistor 10 to the diaphragm setting ring so as to control the resistance thereof in accordance with the angular adjustment of the diaphragm setting ring and the variable resistor 11 is correspondingly controlled in accordance with the angular displacement of a film sensitivity setting ring. The variable resistor 12 is controlled by any suitable mechanism to vary its resistance in accordance with the relative angular position or degree of coupling of the screw coupled objective mount.

Considering now the operation of the system described above, the armature or moving element of the meter 6 is deflected in an amount and direction determined by the currents flowing through the opposing or bucking meter windings 7 and 8. By reason of the aforesaid characteristics of the network 1 the current flowing through the meter winding 7 varies with the EV value of the incident light that is with each doubling of the incident light intensity there is an increment increase in current. The variable resistor 12 is automatically adjusted, for example by a rod member projecting from the objective barrel and coupled to the adjustable member of the variable resistor 12, to compensate for variations in the screw coupling of the objective barrel by correspondingly varying the current through the coil 8. The variable resistor 11 is adjusted in accordance with the film sensitivity value and the variable resistor 10 is adjusted in accordance with the angular displacement of the diaphragm ring which initially establishes the diaphragm value. Accordingly as a result of the current flowing through the variable resistors and the meter winding 8, the diaphragm setting error consequent to any error in or deviation of the screw coupling of the objective is automatically corrected, the current being equal to the sum of the current corresponding to the set diaphragm value and a current corresponding to the film sensitivity value compensated by the variable resistor 11 inserted in parallel with the variable resistors 10 and 12.

The meter 6 is thus provided with a winding 7 excited in accordance with the object brightness and another winding 8 excited in accordance with the photographing conditions other than objective brightness, such as film sensitivity and set diaphragm value, so that the armature of movable part of the meter 6 is deflected according to the excitation difference between the windings 7 and 8. Accordingly, a proper exposure setting may be achieved by a zero-registration method or the like using a pointer secured to the meter armature so as to move therewith.

Thus, in the present system, the meter 6 for indicating the exposure setting value has the windings 7 and 8, and through one of these windings there flows a current corresponding to the object brightness while through the other winding there flows a current corresponding to the photographing conditions other than the object brightness, each of which photographing conditions effects adjustment by means of the variable resistors 10 and 11 connected in parallel with each other; and the variable resistor 12, connected in parallel with said variable resistors 10 and 11, is set according to the screwed-in or coupled position of the objective barrel so as to correct any exposure setting error due to angular displacement of the objective mounting position, thus enabling the user to achieve a proper exposure.

The variable resistor 12 may be inserted in parallel with the light detecting network 1 instead of in parallel with the variable resistors 10 and 11.

Figure 2:
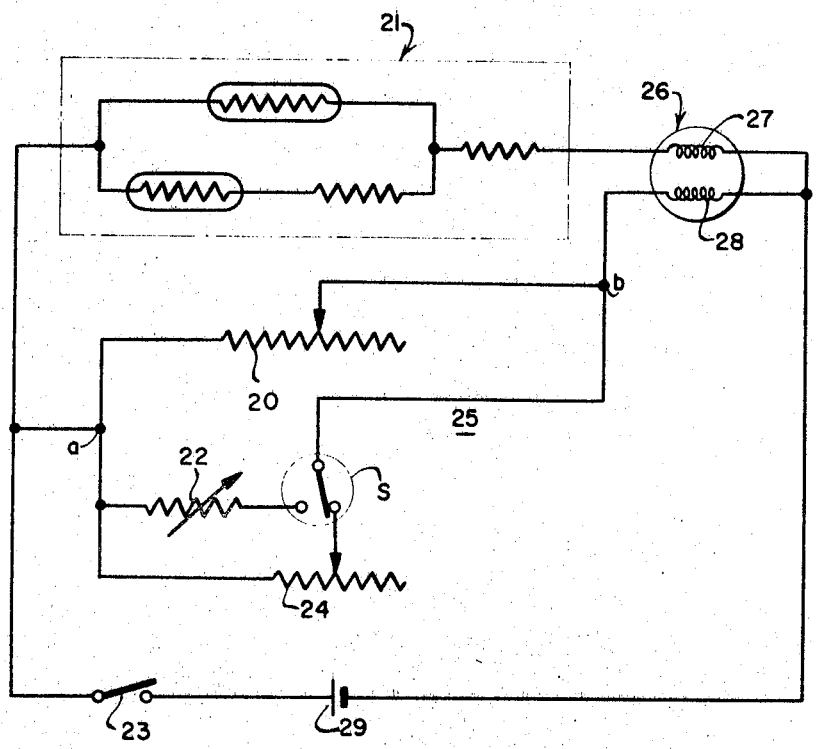
FIG. 2 is a circuit diagram of another embodiment thereof.

In FIG. 2 of the drawings there is illustrated another embodiment of the present invention differing from that described above primarily in the network employed for adjusting the current through the second coil of the differential meter. Specifically, there is provided a differential current meter 26 corresponding to the meter 6 and having a pair of opposing first and second windings or coils 27 and 28 respectively. A light sensing network 21, similar to the light sensing network 1 previously described, is connected in series with the meter coil 27 and a switch 23 to the opposite terminals of a voltage source battery 29.

A current adjusting network 25 including terminals $a$ and $b$ is connected in series with the meter second coil 28 and the switch 23 between the opposite terminals of the battery 29. The network 25 includes a first variable resistor 20 connected between the network terminals $a$ and $b$, a double throw switch S, a second variable resistor 22 connected between the network terminal $a$ and one contact of the switch S and a third variable resistor 24 connected between the network terminal $a$ and the other contact of the switch S, the arm or blade of the switch S being connected to the network terminal $b$. The variable resistors 20, 22 and 24 are coupled to camera control and adjusting mechanisms and are adjusted therewith, the variable resistor 24 being adjusted in accordance with the diaphragm value and the variable resistor 20 being adjusted in accordance with the shutter speed or film sensitivity or a function of these two values. The variable resistor 22 is adjusted to a proper value for employing the systems with a manually adjusted or stopped down diaphragm operation. The switch S is coupled to a selector member for effecting the automatic-manual operation of the diaphragm for alternatively inserting the variable resistors 24 and 22 into the circuit.

Considering now the operation of the system last described, the meter 26 is so arranged that the pointer thereof is deflected in accordance with the difference between the currents which respectively flow through the bucking windings 27 and 28. When the switch 23 is closed, a current under control of the object brightness due to the light that has passed through the objective flows through the light responsive network 21 and the winding 27, while through the winding 28 there flows a current controlled by the variable resistor 24 set in accordance with diaphragm value and also by the variable resistor 20 set in accordance with shutter speed or sensitivity of the film used or a function of these two values. Thus, the pointer of the meter 1 is deflected in accordance with the differences between the exposure setting condition due to the object brightness and the setting condition of the diaphragm or shutter speed, etc. By employing the index registration procedure to such deflection of the pointer of the meter 26, an automatic diaphragm exposure setting operation may be performed with the diaphragm value applied to the arrangement and with the diaphragm aperture fully open.

When the exposure setting operation is to be performed with the diaphragm aperture manually stopped down, upon actuation of automatic-manual changeover lever, the switch S coupled to said lever is changed-over from the variable resistor 24 side to the resistor 22 side. Thus, the variable resistor 24, which varies its value in accordance with the set diaphragm value, is removed from the circuit for controlling the current passing through the winding 28, and instead the resistor 22, adjusted to a suitable value for maintaining the proper operation of the circuit, is inserted into the circuit.

Accordingly, through the winding 27 of the meter 26 there flows a current varying in accordance with the object brightness due to the light that has passed through the objective and under the restriction of the diaphragm aperture, while through the winding 28 there flows a current controlled in accordance with conditions such as shutter speed, etc., without the diaphragm condition. Thus, the diaphragm condition is given to the exposure control operation through brightness of the light from the object which has passed through the objective and reaches the photoconductive light sensing network 21, while it is assured that the diaphragm condition given by adjustment of the variable resistor 5 upon fully-open diaphragm exposure control operation, is positively eliminated. Accordingly, double establishment of diaphragm condition is avoided and proper exposure control operation is accomplished.

Thus, in the system of FIG. 2, a current in accordance with the object brightness setting condition and a current in accordance with the other setting conditions are respectively caused to flow through the windings 27 and 28 of the meter 26 and arrangement is further so made that the diaphragm condition may be independently applied to the system. To such system there is added a change-over switch S coupled to the automatic-manual changeover lever so that diaphragm condition is properly given in both fully-open and stopped-down diaphragm exposure setting operations. The change-over of said fully-open and stopped-down diaphragm exposure setting operations is automatically performed by said change-over lever so that erroneous operation is avoided.

While there have been described and illustrated preferred embodiments of the present invention it is apparent that numerous alterations, omissions and additions may be made without departing from the spirit thereof.

I claim:

1. A light measuring system in a camera including an objective screw mount and an adjustable diaphragm interchangeable objective screw coupled thereto comprising a current meter including a pair of opposing first and second coils, a voltage source, a photoconductor network passing a current which varies in accordance with the EV value of the light incident thereon, means connecting said photoconductor network and said first coil in series across said voltage source, means for applying an adjustable current through said second coil including a plurality of parallel connected variable resistors connecting said second coil across said voltage source, means responsive to the degree of coupling between said mount and said objective for adjusting one of said variable resistors, means responsive to the opening of said diaphragm for adjusting another of said variable resistors, and a switch for alternatively connecting one of a pair of said variable resistors in series with said second coil across said voltage source.

2. The system of claim 1 wherein said photoconductor network includes a first photoconductor and a first resistor connected in series with said first coil across said voltage source, and a second photoconductor and second resistor connected in series across said first photoconductor.

References Cited

UNITED STATES PATENTS

| | | | |
|---|---|---|---|
| 3,163,097 | 12/1964 | Zenyoji et al. | 95—42 XR |
| 3,176,312 | 3/1965 | Reinsch. | |
| 3,179,808 | 4/1965 | Grey et al. | |
| 3,275,399 | 9/1966 | Johnson | 352—41 |

NORTON ANSHER, Primary Examiner

J. F. PETERS, JR., Assistant Examiner

U.S. Cl. X.R.

352—141; 356—222